United States Patent
Kyne et al.

(10) Patent No.: US 7,984,513 B1
(45) Date of Patent: Jul. 19, 2011

(54) METHOD AND SYSTEM FOR USING A RULES ENGINE FOR ENFORCING ACCESS AND USAGE POLICIES IN RIGHTS-AWARE APPLICATIONS

(75) Inventors: Fajen Kyne, Littleton, MA (US); Omri Traub, Cambridge, MA (US)

(73) Assignee: Liquid Machines, Inc., Waltham, MA (US)

( * ) Notice: Subject to any disclaimer, the term of this patent is extended or adjusted under 35 U.S.C. 154(b) by 1092 days.

(21) Appl. No.: 11/352,402

(22) Filed: Feb. 9, 2006

Related U.S. Application Data (60) Provisional application No. 60/651,309, filed on Feb. 9, 2005.

(51) Int. Cl.
G06F 7/04 (2006.01)

(52) U.S. Cl. ............... 726/30; 726/22; 726/24; 726/26; 726/27; 713/151; 706/47; 718/102

(58) Field of Classification Search ............... 726/2, 30; 713/165, 151
See application file for complete search history.

(56) References Cited

U.S. PATENT DOCUMENTS

| | | | | |
|---|---|---|---|---|
| 5,278,901 | A * | 1/1994 | Shieh et al. ............ | 726/22 |
| 6,476,833 | B1 * | 11/2002 | Moshfeghi ............ | 715/854 |
| 6,775,780 | B1 * | 8/2004 | Muttik ............ | 726/24 |
| 7,607,131 | B2 * | 10/2009 | Oe et al. ............ | 718/102 |
| 2002/0099952 | A1 * | 7/2002 | Lambert et al. ............ | 713/200 |
| 2003/0191730 | A1 * | 10/2003 | Adkins et al. ............ | 706/47 |
| 2003/0212902 | A1 * | 11/2003 | van der Made ............ | 713/200 |
| 2004/0054894 | A1 * | 3/2004 | Lambert ............ | 713/165 |
| 2004/0138936 | A1 * | 7/2004 | Johnson et al. ............ | 705/7 |
| 2005/0108518 | A1 * | 5/2005 | Pandya ............ | 713/151 |
| 2008/0271163 | A1 * | 10/2008 | Stillerman et al. ............ | 726/30 |

OTHER PUBLICATIONS

Erlingsson, U. and F.B. Schneider, "SASI Enforcement of Security Policies: A Retrospective," *Proceedings of the 1999 Workshop on New Security Paradigms*, pp. 87-95 (1999).

Ilgun, K. and R.A. Kemmerer, "State Transition Analysis: A Rule-Based Intrusion Detection Approach," *IEEE Transactions on Software Engineering* 21(3):181-199 (1995).

Lindqvist, U. and P.A. Porras, Detecting Computer and Network Misuse Through the Production-Based Expert System Toolset (P-BEST), *Proceedings of the 1999 IEEE Symposium on Security and Privacy*, pp. 146-161 (1999).

Schneider, F.B., "Enforceable Security Policies," *ACM Transactions on Information and System Security* 3(1):30-50 (2000).

Tsudik, G. and R. Summers, "AudES—an Expert System for Security Auditing," *Proceedings of the AAAI Conference on Innovative Applications in Artificial Intelligence*, pp. 221-232 (1990).

(Continued)

*Primary Examiner* — Taghi Arani
*Assistant Examiner* — Jason Lee
(74) *Attorney, Agent, or Firm* — Hamilton, Brook, Smith & Reynolds, P.C.

(57) ABSTRACT

Computer system and method enforces control policies including access and usage policies. A rules-based engine member or assembly is coupled between a rights-management (or similar) system and one or more target applications. The rules-based engine member centralizes data security determinations for the target applications. One or more agents are responsive to the rules-based engine member and target applications, and handle low-level details in interactions between the rules-based engine member and target applications. A generic engine framework serves as a normalizing factor and enables scalability.

22 Claims, 4 Drawing Sheets

OTHER PUBLICATIONS

Giarratano, J.C. and G.D. Riley, *Expert Systems Principles and Programming*, Thomson Course Technology, 4th Edition (2005), description downloaded from http:hed.thomsonlearning.co.uk/controls/printable/aspx?isbn=0534384471.

Krause, M. and H.F. Tipton, *Handbook of Information Security Management*, Auerbach Publications, (1998), description downloaded from http://btobsearch.barnesandnoble.com/booksearch/isbninquiry.asp?z=y&btob=Y&ean=9780849399473& . . . .

* cited by examiner

METHOD AND SYSTEM FOR USING A RULES ENGINE FOR ENFORCING ACCESS AND USAGE POLICIES IN RIGHTS-AWARE APPLICATIONS

RELATED APPLICATION

This application claims the benefit of U.S. Provisional Application No. 60/651,309, filed on Feb. 9, 2005. The entire teachings of the above application are incorporated herein by reference.

BACKGROUND OF THE INVENTION

Software solutions marketed for data security allow an owner of sensitive information to specify access and usage rights for the electronic documents, electronic messages, or more generically any data objects that contain sensitive information. As used here a control policy is a bundle of access and usage rights defined in the context of a rights-management system, and a protected data object is a data object with a specific control policy, not just a blanket "all rights". Unfortunately, control policies and their supporting rights-management systems do not comprise a complete and comprehensive solution for the data security market. Even shipping a single rights-aware application will generally fall short of a complete and comprehensive solution because of the lack of interoperability with other applications. A complete and comprehensive solution, such as the one sold by Liquid Machines, Inc. (assignee), offers a suite of software applications that are each integrated with one or more rights-management systems. These rights-aware applications can manipulate both protected and unprotected data objects, and when manipulating protected data objects, rights-aware applications seamlessly enforce the protections (i.e., the access and usage rights) afforded by the specified control policies.

Central to the correct functioning of rights-aware applications is the ability to maintain the association of a control policy with a data object and its protected content, independent of the type of persistent or transient storage (e.g., temporary files or clipboard buffers) used by the application during manipulation of the data object. Given that many existing applications can manipulate two or more data objects at the same time, a comprehensive solution must be able to maintain the aforementioned associations even when an application concurrently manipulates multiple data objects with different control policies.

When specifying a control policy, most rights-management systems allow the owners of data objects to specify access and usage rights in terms of simple actions taken by principals on the data objects. For example, Alice may give Bob the ability to open and print the finance report, but not make changes to it. Here, Alice "owns" the finance report and sets the control policy associated with it. Bob is a principal in the rights-management system whose interactions with the finance report through applications are restricted to be within the bounds of the report's control policy.

So, how are the rights described in a control policy checked within an application to restrict a principal's activities with each protected data object? The answer to this question is best understood by viewing the integration of a rights-management system with an application as a two-step process. This two-step process connects the complex semantics of a control policy right with one or more sequences of specific low-level program events whose composition indicates a user's attempt to exercise that right. This two-step process occurs even in the case where the rights-management system provides a software developer kit (SDK) to aid in the creation of a rights-aware application.

Working from control policies down to program events, integrating an application with a rights-management system begins with a translation of the high-level semantics of control policies into the collections of simple program events. One can think about these as generic program events (e.g., an event which opens a file). In the second step in the process, the generic program events are mapped to low-level program operations (or events), e.g., a call to "CreateFile" in the WINDOWS operating system.

Though several applications may compose the same set or sets of generic program events to indicate a particular control policy right, a comprehensive solution to the data security problem must, in the worst case, support for each application a unique mapping from control policy rights to compositions of generic program events. Given multiple different rights-management systems, each application may also require, in the worst case, unique mappings from the specific control policy rights of each rights-management system to compositions of that application's generic program events.

As a very simple example, checking and appropriately reacting to an attempt by Bob to save changes to the protected finance report could appear within an application as the creation of a file handle based on the new file name followed later by a write request on that file handle with a program buffer containing data from the protected finance report. Creating a user-friendly error message and single audit log entry explaining that Bob attempted and did not have the right to perform this action would require collecting and correlating information from at least three separate program events. In general, creating a minimum number of appropriate error messages and log entries requires a careful understanding of the program context to differentiate between similar sequences of separate program events.

To complete the integration of a rights-management system with an application, one must determine for each application which actual program operations (or low-level program events) map to the generic program events used in the first step, know how to post operations as generic events to the rights-management system, and understand how to enforce the edicts of the rights-management system. In general, it is straightforward to map actual program operations to semantically equivalent generic program events, so the only semantically difficult mapping step is the previous one.

Clearly, the two steps in this process require different types of expertise. For ease of exposition, let's call the first person a product manager and the second a software engineer. The product manager is responsible for composing generic program events and working with control policies. The product manager must understand the operation of the target application in terms of generic program events and the semantics of the rights in the rights-management system. The software engineer, on the other hand, is responsible for mapping actual program operations to generic program events and for inserting code similar to that used for inline reference monitors into the application. The software engineer must understand the low-level details of the application's implementation (e.g., it uses "CreateFile" to open files) and the building of inline reference monitors.

An outcome of this separation is that the software engineer needs to know practically nothing about the complex operation of an application and the model of data security proposed for this application. The software engineer can quickly and confidently integrate inline reference monitors into the application, leaving out the details of mapping collections of events to policy rights. It is this mapping that is often controversial, difficult to get right the first time, and apt to change as threats evolve and new ones surface.

Without this two-step structuring, a product manager needs to involve a software engineer when the product manager desires to change the composition or mapping of program events to rights. Furthermore, without such a structuring, changes that only affect the manner in which an application should enforce the control policies of the rights-management system almost always imply low-level changes in the code of the application. Such low-level changes may result in complex software bugs that cause the application to crash. Of course, it is always possible that a change in the composition or mapping of program events to rights may be done incorrectly, but by eliminating the tedium of having to deal with actual program operations (and instead deal with generic program events), it is more likely that a mistake in the data security model results simply in an undesired data leak rather than a program crash. The former allows the user to continue working with a loss of data protection; the latter inhibits the user's ability to work and subjects users to a potentially catastrophic loss of data.

When reviewing existing approaches, one is interested in the structuring of the connection between an application and a rights-management system, and in the technology used for mapping events in the application to policy rights in the rights-management system. Without loss of generality, it is assumed that all rights-management systems provide a set of application programming interfaces (APIs) to support integration of the rights-management system into an application.

A straightforward approach for integrating an application and a rights-management system is to add code to the application which directly invokes methods in the rights-management system's API. Such an approach produces a large amount of code unique to the application, the particular rights-management system used, and the specific rights to be enforced. This large engineering cost is acceptable as long as it is non-recurring and can be amortized over the lifetime of the resulting rights-aware application. However, in many markets it is important to integrate many applications with several different rights-management systems. For example, inserting into code a check which checks individual rights when the code is about to perform a document save is manageable when such a check (or several checks from several applications) is inserted into a single rights-management system. In contrast, having to insert the check (or several checks from several applications) into multiple rights-management systems is not as manageable. Maintenance also becomes a management nightmare. Accordingly, there needs to be solutions which minimize the engineering cost of integration.

One well-known way to reduce the cost of integration is to structure the integration so that it tracks important application events and maps them to actions of significance that are controlled by the rights-management system using a well-defined computational model. Models commonly appearing in rights-managed applications are state machines or automata.

When program events are filtered and processed locally (at the point in the code where the event resides), the integration yields a design based on a distributed state machine. Though distributed state machines have their advantages, they result in a rights-aware application where the rules and state controlling the program's execution are distributed and tightly interleaved with the application's code. The result is an integration that is hard to debug if mistakes are identified in the mapping of program events to policy rights, or hard to update robustly if modifications are necessary in this mapping because of a change to the rights-management system (e.g., the addition of new rights). Furthermore, such integration makes it difficult to port to a new rights-management system.

Erlingsson and Schneider have suggested that security automata are an appropriate formalism for integrating into an application a reference monitor enforcing any security policy, of which a rights-management system is an instance. Ulfar Erlingsson and Fred B. Schneider. "SASI Enforcement of Security Policies: A Retrospective," Proceedings of the 1999 Workshop on New Security Paradigms, pp. 87-95, 1999 (hereinafter "Erlingsson & Schneider"). Program events correspond to the input alphabet of the automaton; the automaton states encode the state of the application with respect to its security policy; and the transitions between the states encode the actual security policies. Though this centralized approach eliminates the robustness and testability issues cited with a distributed design, Erlingsson and Schneider admit that the two prototypes that they built based on this idea were not practical tools. In particular, the authors admit that it is too limiting to have to create automaton states for all possible states of the monitored program. They express the desire for a system where it is easy to check application-level abstractions (e.g., the values of string variables). As stated earlier, the policies of modern rights-management systems are often specified using application-level abstractions.

Yet, security automaton demonstrate two characteristics that are important for our target market. Through the use of a Security Automaton Language (SAL), Erlingsson and Schneider were able to hide low-level programming details (e.g., the placement of data and relative offsets of code labels) from those responsible for encoding security policies in SAL. This led to more robust systems with fewer correctness problems. Furthermore, Schneider points out that the use of an automaton simplifies prototyping and testing of security policies. Fred B. Schneider. "Enforceable Security Policies," ACM Transactions on Information and System Security, 3(1): 30-50, February 2000 (hereinafter "Schneider"). Testing is in fact "just a matter of running the automaton." Schneider.

In summary, there is a recognition in the industry that one should centralize the component that tracks program events and maps those events to policy rights, that one should allow those responsible for mapping program events to policy rights to be able to specify this mapping without having to deal with low-level implementation details of the application and rights-management system, and that one should base this component on a computational model that allows for quick prototyping and easy testing of new control policy specifications. On the other hand, the industry does not appear to have identified a computational model with the aforementioned benefits that also can check runtime values based on application-level abstractions. Finally, the industry does not seem to have a strong notion of how to repeatedly develop rights-aware applications such that the user messages and audit log entries produced are semantically rich and accurately reflect the current application and user activity.

SUMMARY OF THE INVENTION

An embodiment of the present invention includes a computer implemented method and system for enforcing control policies of a rights-management system with respect to a target application.

A rights-management system describes policies for controlling access to and usage of sensitive content. A rights-aware application is the integrated result of a software application and a rights-management system.

The key insight underlying the current invention is a component which matches specified patterns in a sequence of application events (i.e., low-level program events) and produces judgments about the semantic significance of the events. It is the judgments of this component which asserts (or creates) facts about the state of the application and ultimately direct the enforcements described by the rights-management system.

Developers and researchers have used a variety of computational models, such as security automata and state machines, as the foundation for such a component. In such models, the policy rights controlling the execution of the rights-aware application are distributed and tightly interleaved throughout the code of the software application. Consequently, it is hard to debug if mistakes are identified in the mapping of application events to policy rights. It is also hard to update robustly if modifications are necessary in the mapping because of changes to the rights-management system.

The present invention demonstrates that a design based on a rules engine has significant technical and software engineering advantages over these previous approaches. As a result, the current invention simplifies the development, and improves the robustness and testability of rights-aware applications.

Accordingly, the invention method for enforcing the control policies of a rights-management system with respect to a target application includes (i) coupling a rules-based engine between the rights-management system and one or more target applications; (ii) and handling low-level program details outside the rules-based engine. The rules-based engine centralizes data security determinations for the target applications. The low level details are of interactions between the rules-based engine and respective target applications.

The step of coupling may include identifying a sequence of application events for each target application by: (a) monitoring the low-level program events of each target application, (b) translating the monitored low-level program events into generic program events, and (c) asserting the translated generic program events as facts to the rules-based engine. The step of coupling may produce judgments about the semantic significance of the sequence of application events of each target application by evaluating the asserted facts against one or more rules. Each rule encodes the control polices of the rights-management system in a generic (or normalized) vocabulary. For example, in one embodiment the policy rules are described in terms of generic program events and application-level abstractions. As a result, the behavior of each target application is modified to conform to the control polices of the rights-management system.

The invention method, in identifying the sequences of application events, may filter the sequence of application events so that only significant events are asserted as facts to the rules-based engine.

The step of modifying may include posting new or modifying existing facts which the low-level enforcement code in each target application can then check, and executing code, coupled to the firing of a subsequent rule, which directly affects the state of each target application, or any combination thereof.

In another embodiment, the invention method may also include the step of creating an application-specific instance of the rules-based engine based on existing instances of the rules-based engine. The application-specific instance may be created by (a) identifying actual program operations relevant to enforcing the control policies of the rights-management system, (b) mapping the identified actual program operations to generic program events, (c) grouping the mapped generic program events into one or more groupings, each grouping covering a set of possible control policy actions, (d) identifying groupings of generic program events from existing applications which are identical to the grouped generic program events, (e) copying rules and fact definitions from the identified groupings of generic program events when identical groupings of generic program events are found in existing applications, (f) creating new rules and new fact definitions for groupings of generic program events when identical groupings of generic program events are not found in existing applications, and (g) packaging the copied and created rules and fact definitions to create the application-specific instance of the rules-based engine.

In yet another embodiment, the invention method may also include testing a first instance of the rules-based engine. This is accomplished by recording an input sequence of facts asserted to a second instance of the rules-based engine (a "recorded input") and recording an output sequence from the second instance of the rules-based engine (a "recorded output"). The recorded input is played backed to the first instance of the rules-based engine. An output sequence from the first instance of the rules-based engine is then compared against the recorded output. As a result of the comparing, the invention determines whether the testing of the first instance of the rules-based engine is successful or not.

The output sequences from the first instance of the rules-based engine and the second instance of the rules-based engine may be any combination of fact modifications and external actions.

In still another embodiment, the invention method may also include defining a logical lifetime of a document in terms of an application's use of the document. This defining is being done in a manner which is independent of source code for the application being available. The invention method further tracks the logical lifetime of the document on a per application basis. As a result of the tracking, the invention creates a document fact which lives as long as the application uses the document. The created document fact corresponds to the application's use of the document and serves as input to the rules-based engine. Alternatively, the document fact stores judgments about the semantic significance of previously observed low-level program operations (or events) on the document.

In still yet another embodiment, the invention method may further include (i) tracking a series of low-level program events whose composition indicates a user's attempt to exercise a control policy right, and (ii) auditing (or logging) the user's attempt to exercise the control policy right.

In one embodiment, the invention method may further include intercepting a user's attempt to exercise a control policy. The invention blocks the intercepted user's attempt to exercise the control policy right at a semantically appropriate logical level. As a result of the blocking at the semantically appropriate logical level, the generation of duplicate audit messages for this one intercepted user attempt is suppressed.

A computer apparatus for enforcing control policies of a rights-management system with respect to a target application includes a rules-based engine member for coupling between the rights-management system and one or more target applications. The rules-based engine member centralizes data security determinations for the target applications. One or more agents are coupled between the rules-based engine member and the target applications for handling low-level details in interactions between the rules-based engine member and respective target applications.

The rules-based engine member may employ (a) a generic engine framework, (b) a rules engine, (c) a working memory storing assertions of the target applications as supplied by the agents, and (d) a knowledge base holding sets of rules. The sets of rules held in the knowledge base may encode the control policies of the rights-management system as generic program events and application-level abstractions.

Additionally, the rules-based engine member may be structured as a distinct layer between the rights-management system and each target application.

In another embodiment, the rules-based engine member defines a logical lifetime of a document in terms of an application's use of the document. This defining is done in a manner independent of source code for the application being available. The rules-based engine member tracks the logical lifetime of the document on a per application basis, and creates document facts which live as long as the application uses the document. Each created document fact corresponds to a respective use of the document by the application and serves as input to the rules-based engine.

Applicants refer to a component designed in this fashion as the application expert or APEX engine.

The following is a detailed list of primary benefits of the current invention:
1. The invention simplifies the development of rights-aware applications by allowing those familiar only with the general operation of and controls to be imposed on an application—and not necessarily familiar with the implementation details of the application or the rights-management system—to specify:
   which application events and actions should be controlled;
   how the application events and actions should be controlled;
   whether the application events and actions should be audited; and
   when the rights-management system should interact with the user of the applications.
2. The invention simplifies the development and improves the robustness of a rights-aware application by ensuring that the integration of an application and a rights-management system:
   does not impact or constrain the correct operation of any other supported application;
   leverages existing support for similar applications; and
   is predictable in scope and effort.
3. The invention simplifies the development and improves the robustness of a rights-aware application by using a structure that is flexible and expressive enough to handle the small but important differences between common application events. By considering these differences, a rights-aware application can produce a minimal number of user messages and audit log entries that are semantically rich and accurately reflect the current application and user activity.
4. The invention improves the testability of a rights-aware application by reducing the amount of time it typically takes and the sophistication of the tool required to test changes to the mapping between program events and rights management judgments. In particular, the invention compartmentalizes the logic associated with this critical mapping function and defines a clean interface for posting program events and observing the rights management commands generated by those events.
5. The invention increases robustness and simplifies making changes to any aspect of a rights-management integration (e.g., different mapping or different handling of application events) by externalizing the rights-management system from the application. Consequently, no source code changes are required.
6. The invention creates a layer of indirection between the rights-management system and the application which facilitates integrating multiple rights-management systems in a clean, robust, and easily maintainable way.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention is formed of a rules-based engine member or component which employs a rules engine. The architecture of the rules engine is similar to those found in the field of expert systems. The rules engine serves as the computational model used to identify specific patterns in sequences of application events which signify actions managed or monitored by the control policies of a rights-management system. The rules-based engine member of the present invention is referenced herein as the APEX engine 115 (see FIG. 1).

Expert systems and their rules engines are well suited to problem domains where reasoning about facts is the most effective method for finding a good solution. Joseph C. Giarratano and Gary D. Riley. "Expert Systems Principles and Programming," Thomson Course Technology, 4th Edition, Boston, Mass., 2005 (herein after "Giarratano & Riley"). Enforcing control policies in a rights-aware application is such a problem domain, since the orderings of the low-level program events which comprise the actions managed by the rights-management system may be partial orderings in one application and complete orderings in another. Expert systems are also well known for their ability to explain the reasoning behind their conclusions and actions. This feature is important to this specific problem domain because the result of an integration of an application and a rights-management system should be able to produce accurate, understandable error messages and audit log entries. Furthermore, the rules engines in expert systems are known to be flexible—they provide efficient mechanisms for adding, changing, and deleting knowledge (i.e., rules). Giarratano & Riley. This feature addresses the need to adapt the integration of an application and rights-management system easily as threat models, auditing requirements, and application features change over time. Finally, the rules engine of an expert system is a modular component that effectively externalizes domain-specific information. As such, it can exist as a distinct layer between a rights-management system and a software application. As a distinct layer, it compartmentalizes the logic associated with the mapping of program events to control policies and defines a clean interface for testing changes to this mapping.

Expert systems have been proposed for use in security, but primarily in information security risk assessment (Micki Krause and Harold F. Tipton. Handbook of Information Security Management, Auerbach Publications, 1998), intrusion detection (Koral Ilgun, R. A. Kemmerer, and Phillip A. Porras. "State Transition Analysis: A Rule-based Intrusion Detection Approach," IEEE Transactions on Software Engineering, 21(3):181-199, March 1995 and Ulf Lindqvist and Phillip A. Porras. "Detecting Computer and Network Misuse Through the Production-Based Expert System Toolset (P-BEST)," Proceedings of the 1999 IEEE Symposium on Security and Privacy, pp. 146-161, May 1999), and security auditing (Gene Tsudik and Rita C. Summers. "AudES—An Expert System for Security Auditing," Proceedings of the AAAI Conference on Innovative Applications in Artificial Intelligence, pp. 221-232, 1990).

Applicants are unaware of any prior work that uses a rules engine in the application of rights management.

The rules engine of an expert system draws inferences from the facts stored in its working memory. The knowledge base (or rules base) of the rules engine directs the actions of the expert system. The rules engine consults the knowledge base when new facts are asserted. A rule consists of conditions (e.g., combination of facts in the working memory) that must hold for the rule to fire, and a set of actions to execute when the rule fires. An action may involve changing the content of the working memory—by posting new facts, modifying existing facts, or deleting outdated facts—or performing one or more external actions (e.g., writing an audit log entry).

Clearly, the firing of one rule may enable one or more other rules to fire. Execution continues until equilibrium is found, where no more rules fire. As part of this process, a rules engine typically implements some sort of conflict-resolution mechanism to select which rule executes when multiple rules can fire simultaneously (e.g., knowledge base may impose only a partial ordering on the rules). Only one rule fires at a time, and the fired rule runs to completion.

Figure 1:
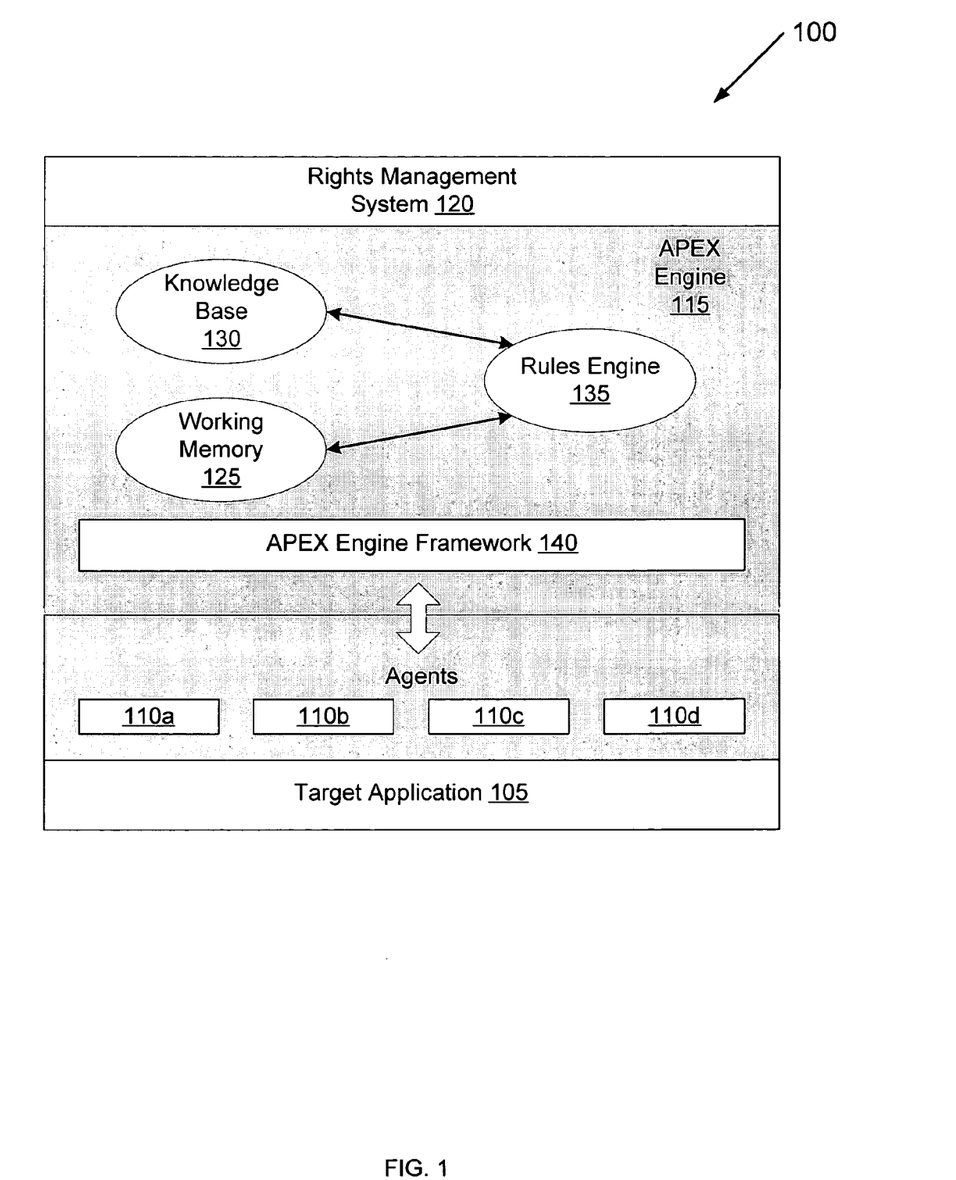
FIG. 1 is a block diagram of a rights-aware application having an APEX engine in accordance with one embodiment of the present invention.

Referring to FIG. 1, using a rules engine 135, applicants construct applications which enforce the control policies of one or more rights-management systems 120. In particular, the primary operation of the invention APEX engine 115 is to identify patterns of facts in its working memory 125. The noteworthy patterns are specified by the rules in a knowledge base 130 of the APEX engine 115. These rules encode the control policies of the rights-management system 120 in the vocabulary of a target application 105 (e.g., in low-level program events and application-level abstractions). Working with low-level program events and application-level abstractions, the APEX engine 115 produces judgments about the operation of the target application 105 and whether it (and its user) is abiding by the control policies of the rights-management system 120. Alternatively, it is possible for the APEX engine 115 to work directly with untranslated, application-specific, low-level program events (not shown). To modify the behavior of the target application 105 to conform to the control policies, the APEX engine 115 posts new or modifies existing facts in its working memory 125, which low-level enforcement code in the target application 105 can then check, or the APEX engine 115 executes code, coupled to the firing of a rule, which directly affects the state of the target application 105. In the latter case, a rule might specify, for example, that the APEX engine 115 create and write an audit log entry based on the facts that caused the rule to fire.

A description of an embodiment of the present invention follows. In particular, below is described an embodiment of the present invention for a computer running one of the variants of the MICROSOFT WINDOWS operating system. This embodiment focuses on the rights management of electronic documents, such as those processed by MICROSOFT WORD and ADOBE ACROBAT. Assume the use of Liquid Machines, Inc.'s (assignee) auto-integration technology for integrating software components into a target application. Vasanth Bala and Michael D. Smith. "Method for Protecting Digital Content from Unauthorized Use by Automatically and Dynamically Integrating a Content Protection Agent," U.S. patent application Ser. No. 10/194,655, filed Jul. 11, 2002 (hereinafter "Bala and Smith"). The following software components are integrated: the APEX engine 115, the client-side portions of a rights-management system 120, the code used to translate actual program operations into generic program events, and the code used to affect program control based on the judgments of the APEX engine 115.

All of these software components could also be directly integrated into the target application 105 and connected to the rights-management system 120 through the use of a software development kit (SDK) for that rights-management system 120. In this case or the one described below, one would still benefit from externalizing the rules and centralizing the decision in the APEX engine 115. The pieces which should be tightly woven into the application's code base are the code snippets which post generic events and those which alter program control based on judgments.

For the purposes of the following description, a document is defined as the unit of content associated with a control policy of the rights-management system and the unit of auditing in this system.

Accurate tracking of the logical lifetime (or session) of a document is key to proper enforcement of the control policies of a rights-management system. The logical lifetime of a document is the time span from when an application first accesses a document until the time when no content associated with that document is actively used by the application. The logical lifetime of a document is bracketed by the birth and death of a document in a particular application. As such, the birth and death of a document are always in the context of a particular application. Consequently, the birth and death of a document may differ from one application to another. As such, the birth and death of a document for each application needs to be identified, and differences between applications need to be accounted for.

This "lifetime" of a document is logical in the sense that the birth or death of a document corresponds to a series of low-level program events. For example, the logical birth of a document may correspond to opening a file, creating a window, and setting a window title. Furthermore, the corresponding series of low-level program events may vary from application to application. For example, in some applications, closing the main window associated with a document ends the logical lifetime of the document. In other applications, in particular computer aided design (CAD) applications; a document is still resident in the application's memory beyond the lifetime of any document window. The document will remain resident until the application is closed or when a user issues an explicit "flush" command. As exemplified in the examples above, while low-level program events may differ from application to application, document births are logically equivalent irrespective of application as are documents deaths.

Tracking the birth and death of a document is relatively easy when source code for an application is available. Such events are readily identified by some well-defined program point (or points) in the source code, e.g., the end of a semantically high-level function which closes a document window and flushes the application's buffers holding the data of the document. Even with source code, however, the birth and death of a document may be difficult to track when a program point (or points) defining document birth and death vary from application to application. For example, returning to the previous example, it is evident the program point marking document death in the source code of the CAD application differs from the program point marking document death in the source code of the other application.

In other words, each application may have its own notion of document birth and death which varies from application to application. In the worst case, no two applications share the same notion of document birth and death. Consequently, a rights-management system needs to appreciate each application's respective notion of document birth and death in order to accurately track the logical lifetime of a document. Perhaps manageable given a few applications, however, as the number of applications increases, each with its own notion of document birth and death, scalability may become an issue.

Unlike tracking the logical birth and death of a document when source code is available, when source code is not available, tracking is not as easy. Without source code to readily identify the logical birth and death of a document, such events must be inferred from the actions corresponding to the birth and death of a document. That is, rather than tracking the termination of a function, the actions of the function closing the document are tracked instead. For example, when the content window of a document is closed, the death of the associated document can be inferred. Equating the logical lifetime of a document with its content window (as exemplified in the previous example), however, is a good approximation for some applications, but not for all. In the previously described CAD application example, a document is resident in the memory of the application beyond the lifetime of any document window. The document "dies" when the application is either closed or a user issues an explicit "flush" command. In this case, it is inappropriate to approximate the logical lifetime of a document by its content window.

Accordingly, regardless of whether source code of an application is available or not, what is needed is a facility for tracking the logical lifetime of a document which provides for a flexible notion of document birth and death. The APEX engine 115, a rules-based engine, enables one to specify freely for each application which low-level program events describe the logical birth of a document and which describe the logical death of a document. For example, consider the following sequence of low-level program events: opening a file "c:\example.doc," creating a window which matches some conditions which qualify it as a document window and changing the title of the window to "example.doc." The logical birth of the document may be described by all three low-level program events. Note how the logic birth of the document is described in terms of the application's use of the document rather than some well-defined program point in the source code of the application. In this way, the logical lifetime of a document is described in a manner which is flexible and independent of source code of the application being available.

As such, even with source code available, tracking the logical birth and death of a document is relatively speaking easier with the APEX engine 115.

As previously mentioned, with the APEX engine 115, one can specify which low-level program events describe the logical birth and death of a document for each application. Consequently, the APEX engine 115 allows the logical birth and death of a document to be tracked on a per application basis. For example, certain applications allow a user to open a file from a remote location using a Uniform Resource Locator (URL). The remote file is downloaded to a locally cached location and then opened in read-only mode. A set of rules deduces the logical birth of the document. This set of rules is present in an application which supports opening from a URL, but is absent from an application which does not. In this way, the APEX engine 115 is able to track the logical birth and death of a document on a per application basis.

By providing for a flexible notion of the logical birth and death of a document and accurately tracking it, the APEX engine 115 can effectively create a document fact which "lives" as long as the target application 105 uses the document or its content. As will be later described in greater detail, the APEX engine 115 processes this document fact as input and produces judgments about the target application's 105 use of the document and its content to enforce the control policies of the rights-management system 120.

The APEX engine 115, in addition to enforcing the control polices of the rights-management system 120, also enables accurate and semantically rich auditing (or user notification) of document access and usage. The APEX engine 115 connects the complex semantics of a control policy right with one or more sequences of specific low-level program events whose composition indicates a user's attempt to exercise the control policy right. For example, a user attempts to save changes to a file whose control policy right denies the user the right to write, i.e., the file is write-protected. The user's attempt to save the file appears in an application as creating a file handle followed by requesting to write to the file handle with a program buffer containing data from the protected file. Logically, these low-level program events correspond to the user's attempt to save changes to the file. In another example, the birth of a document may correspond logically to the low-level program events of opening the document, creating a window, and setting the title of the window to the name of the document. Both the user's attempt to save changes to the file and the logical birth of the document are audited by the APEX engine 115.

The APEX engine 115, with the semantics of the control policy right and the low-level program events connected, audits the user's attempt to exercise the control policy right, as opposed to, the low-level program events corresponding to that attempt. For example, rather than auditing that a file handle was created and a write was requested to write to the file handle with a program buffer containing data from a write-protected file, a failed attempt to write is audited instead. In this way, the APEX engine 115 provides an audit message which is user-friendly. It should be noted, the term "user" in this context is not limited to a human user, but includes a non-human entity such as an auditing system.

The APEX engine 115, in addition to providing user-friendly audit messages, also provides for suppressing redundant audit messages. Consider the following example of a user repeatedly attempting to save a document which does not grant write access. Each time the user attempts to save the document, the target application 105 attempts to write to a file handle one or more times. In a native implementation, each time the application attempts to write to the file handle, a "denied" message would be produced. Repeated attempts to save the document thus result in an audit stream having one or more "denied" messages for every blocked attempt to write to the file handle.

It is not desirable, however, to log each and every blocked write attempt. In some instances, the number of blocked writes will not even be a multiple of the number of times the user actually tried to save the file since the user might have changed the size of the file between save attempts. In fact, the number of times an application failed to write may be of less semantic significance than the fact that the application failed to write at all.

Suppressing redundant audit messages is particularly usefully when audits are processed and/or viewed by entities, such as a content indexing system or a human user. Such entities may not have the capacity or the capability to differentiate the semantic significance amongst a myriad of redundant audit messages.

The APEX engine 115 suppresses redundant audit messages by auditing (or logging) the document at a higher "logical" level rather than at a lower "physical" level of file access. Continuing with the prior example, the APEX engine 115 intercepts the user's save operation and blocks it at that higher "logical" level (as opposed to the lower "physical" level of file access"). In the invention process, almost always one audit message is emitted and logged. Moreover, the APEX engine 115 is flexible enough to control how repeated attempts to save the document should be audited (or logged). For example, a single audit message is emitted, while duplicate audit messages are suppressed.

FIG. 1 illustrates an exemplary rights-aware application 100. The exemplary rights-aware application 100 includes a target application 105, one or more agents 110a-d (generally 110), an APEX engine 115, and a rights-management system 120.

In FIG. 1, the original code of the target application 105 is the base on which the other layers rest. Immediately above this base is a layer of agents 110. Each agent 110 is a specialized inline reference monitor, specialized for a respective particular type of program event or enforcement point. These agents 110 monitor the actual program operations (or low-level program events) of the target application 105, translate these operations into generic program events, and post these events as facts in the working memory 125 of the APEX engine 115. In some cases, for efficiency reasons, an agent 110 may directly filter the stream of low-level program events so that only the significant events are posted to the APEX engine 115. These agents 110 may also query the working memory 125 and alter the control flow of the target application 105 based on the facts found there. Alternatively, the agents 110 may expose command objects to the APEX engine 115. Command objects allow the APEX engine 115, via rule actions, to affect the behavior of the target application 105 directly (e.g., directly change the LIQUID MACHINES POLICY DROPLET, U.S. Design Pat. No. D502,708, issued Mar. 8, 2005).

Above the agents 110 sits the APEX engine 115. It consists primarily of working memory 125, a knowledge base 130, and an inference engine (or rules-engine) 135. The rules in the knowledge base 130 are presently coded in C++, but in an alternate embodiment, the rules may utilize a programming language developed especially for rules-based programming e.g., C Language Integrated Production System (CLIPS) or languages based on CLIPS. See e.g., Giarratano & Riley.

One embodiment maintains a single module for the APEX engine framework 140, which implements a generic rules engine (not shown) and a suite of modules (not shown) for the specific instances of this framework that specialize it for the supported rights-management system (such as 120). In general, the layered architecture allows one to implement, in a straightforward fashion, rights-aware applications which are able to converse with multiple different rights-management system (such as 120). There is a bidirectional binding and communication between the agents 110 and the APEX engine framework 140.

The top of the exemplary rights-aware application 100 is the rights-management system 120 which provides, for example, a vocabulary of rights, a means for retrieve control policies from a rights-management server, and a way for managing keys and licenses for encrypting and decrypting content.

Figure 2:
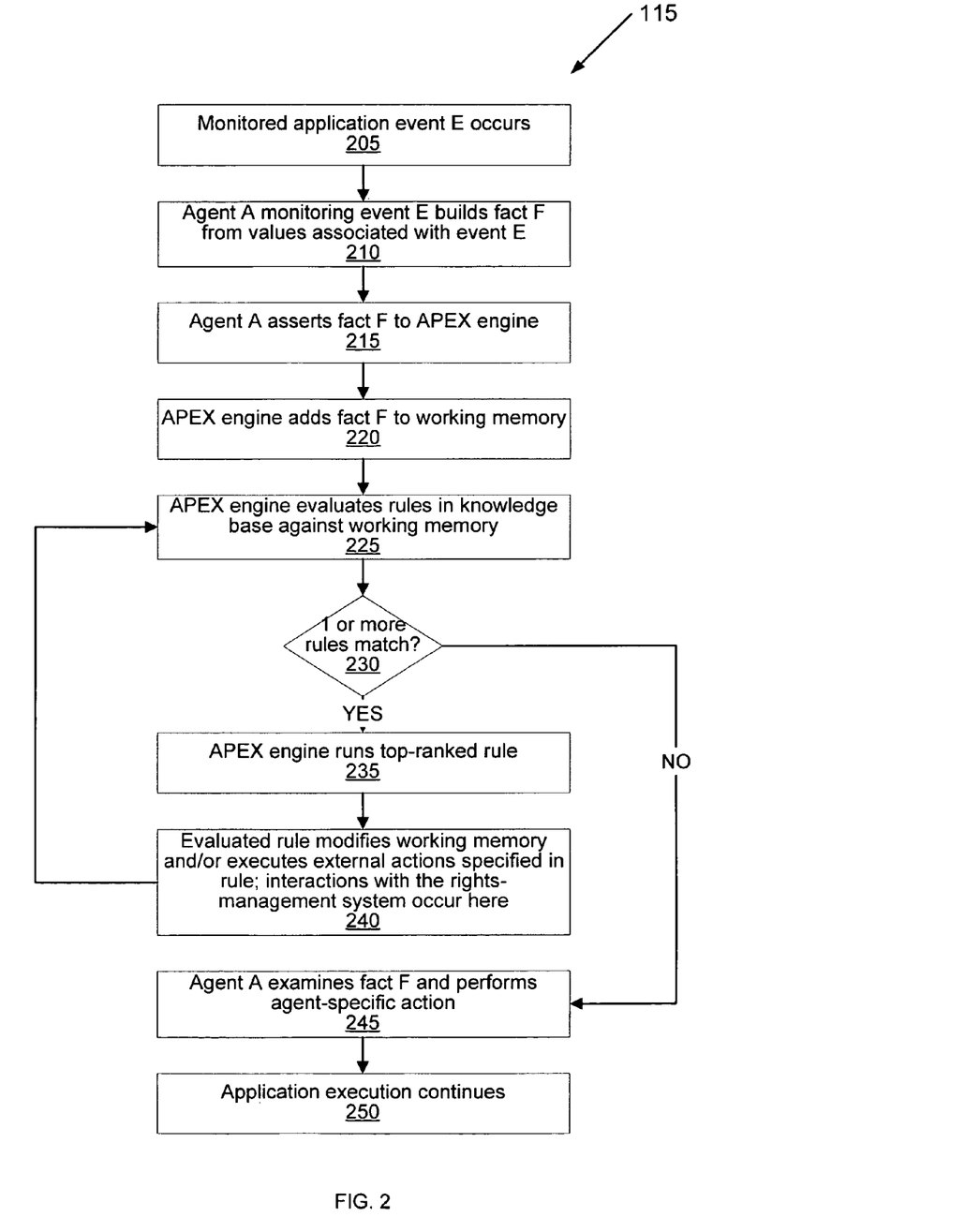
FIG. 2 is a flow diagram for operating the APEX engine of the rights-aware application of FIG. 1 in accordance with one embodiment of the present invention.

FIG. 2. illustrates the operation of the APEX engine 115 of FIG. 1. At step 205, an low-level program event occurs in a target application 105. The event is monitored by an agent 110. At step 210, the agent 110 monitoring the event builds a fact from values associated with the event. The built fact is asserted by the agent to the APEX engine 115 at step 215. At step 220, the asserted fact is added to the working memory 125 of the APEX engine 115. The APEX engine 115 in turn evaluates rules from its knowledge base 130 against the added fact at step 225.

If the fact matches one or more rules at step 230, the APEX engine 115 runs a top-ranked rule at step 235. As previously described, only one rule fires at a time, and a fired rule runs to completion. In the case of multiple rules capable of being fired simultaneously, the APEX engine 115 implements a conflict-resolution mechanism to select which rule executes, e.g., the knowledge base 130 may impose only a partial ordering on the rules.

Running the top-ranked rule at step 235 directs an action of the APEX engine 115. At step 240, the directed action may involve changing the content of the working memory 125 (e.g., by posting new facts, modifying existing facts, or deleting outdated facts), performing one or more external actions (e.g., writing an audit log entry) or a combination thereof. The directed action of the APEX engine 115 modifies the behavior of the target application 105 to conform to the control polices of the rights-management system 120. Consequently, it is at step 240 where the rights-management system 120 interacts with the target application 105.

After directing the action at step 240, the APEX engine 115 returns to step 225 to again evaluate the rules in its knowledge base 130 against its working memory 125. As previously described, the APEX engine 115 continues to evaluated and execute rules until there are no more rules to evaluate and execute i.e., an equilibrium is found. Alternatively, if the fact does not match one or more rules at step 230, the agent 100 may examine the working memory 125 and perform agent-specific actions at step 245. The target application 105 consequently continues with executing at step 250.

With the architecture and operation of an embodiment of the present invention described, its benefits are detailed next.

The layering presented in FIG. 1 compartmentalizes the different aspects of a rights-aware application 100 so that changes in one area have minimal direct effects on another area. For example, plugging an overlooked security vulnerability in a rights-aware application 120 could be as simple as adding one or more new rules to the knowledge base 130. Upgrading a rights-aware version of an application when a new version of the application is distributed that uses a different low-level program operation for a common generic program event could be a simple as changing the implementation of the appropriate agent 110. In another example, one can upgrade the version of the rights-management system 120 (e.g., employing a different technology for licenses and keys) without having to the modify the target application 105. The architecture thus has distinct advantages over alternative implementations which do not adhere to the described partitioning.

By separating the rules which direct the management of an application's behavior from the details of the rules engine and design of the agents which actually perform the enforcement, applicants trade off a small measure of performance for a much more robust design, i.e., a design that allows for a refinement of the rules implementing the control policies without concern for introducing low-level coding bugs that could cause application crashes.

In fact, one is able to use the same APEX engine framework 140 for all applications that one wishes to manage. Each application simply loads the appropriate set of agents and the appropriate knowledge base. Thus, the APEX engine framework 140 is a generic implementation of a rules-based component. This is one important aspect of a scalable approach to creating a large offering of rights-aware applications.

The APEX engine framework 140 serves as a normalizer to application data captured by the agents 110, as well as a normalizer of the rights-management system interaction. As such, the rights-management system 120 may be relevant in the implementation of other pervasive systems which observe and interact with the execution of already developed and deployed applications.

Another important aspect of a scalable approach is the ability to share code or other software components across multiple applications, i.e., "cross-application." In the present invention, two or more target applications 105 could share agents 110 and large collections of rules. For example, target applications 105 which use the same operating system primitives for opening, reading, and modifying files could share the same file system agent 110. If these target applications 105 also use the same user interface code for opening, saving, and closing files (e.g., as many WINDOWS-based applications do), the target applications 105 could also share a common set of rules for handling protected files. In this way, the APEX engine 115 enables a rights-management system 120 to be cross-application.

A separate consequence of this ability to share agents 110 and collections of rules is that it is now possible to quickly prototype a new rights-aware application, especially if it uses the same low-level operating system primitives and user-interface libraries as an existing rights-aware application. In fact, development of a new rights-aware application becomes an exercise in which software engineers focus primarily on the unique aspects of the target application 105, since all of the common aspects are easily (if not directly) ported from an existing set of supported, rights-aware applications.

Figure 4:
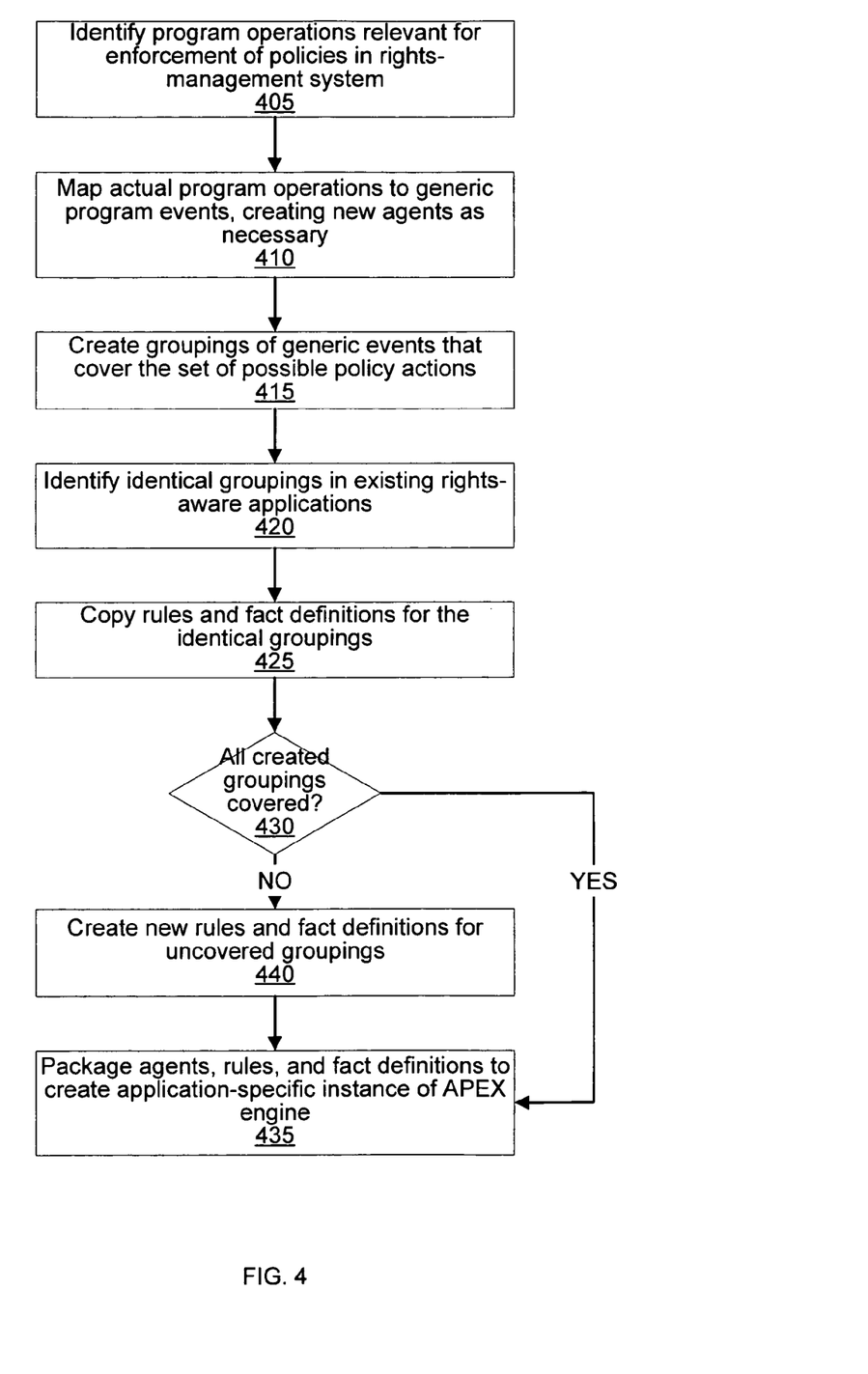
FIG. 4 is a flow diagram for creating a new rights-aware application from an existing rights-aware application in accordance with one embodiment of the present invention.

For example, referring to FIG. 4, a new rights-aware application is created or added by first identifying low-level program events (or program operations) relevant for enforcing polices in a rights-management system 120 at step 405. The identified low-level program events are then mapped to generic program events at step 410. Agents 110 are also created as necessary at step 410.

With the identified low-level program events mapped to generic program events, the generic program events are in turn grouped into groupings at step 415. Each grouping covers a set of possible policy actions. Identical groupings from existing rights-aware applications are identified at step 420. Since the identified groupings are identical to groupings found in existing rights-aware applications, there is no need to create new rules and fact definitions. Instead, rules and fact definitions from existing rights-aware applications are copied at step 425.

If all the groupings created at step 415 are covered at step 430 (i.e., identical groupings are found in existing rights-aware applications), existing agents, rules and fact definitions are packaged at step 435 to create an application-specific instance of the APEX engine 115. In this way, a new rights-aware application can be quickly created or added by copying existing agents, rules, and fact definitions, rather than creating them anew.

Alternatively, if not all of the groupings grouped at step 415 are covered at step 430, new rules and fact definitions are created for the uncovered groupings at step 440. These new agents, rules, and fact definitions are consequently packaged to create an application-specific instance of the APEX engine 115 at step 435.

It is uncommon, however, that two applications will share exactly the same sequences of generic program events. In this case, a new rights-aware application may be alternatively created or added by first identify common areas of functionality between a new application and an existing application. An existing collection of rules and fact definitions from the existing application is then copied for use in the new application. The existing collection of rules and fact definitions are "refactored" to fit both the new application and the existing application, and their sequences. In this way, opportunities to reuse code are not limited to when an exact match exists between sequences of generic program events.

Accordingly, because agents, and collections of rules and fact definitions can be shared, a new rights-aware application can be quickly created or added with minimum amounts of development.

Another significant consequence of this ability to share agents and collections of rules and fact definitions is that it becomes easier to predict the amount of effort required to make a plain application into one that is rights aware. For example, the rules from an existing rights-aware application 100 may work directly in the rights-aware instance of a new application. Other rules may simply need to be customized for small, unique aspects of the new application. Finally, previously unseen functionality in the new application may require completely new rules. By understanding the number of rules in each category, it is easier to predict the effort involved.

By modeling the APEX engine 115 on the rules engine of an expert system, the present invention directly addresses the reality that there is no single correct answer across all target applications 105 as to when a logical document lifetime begins and ends, and that there is no single correct answer across all target applications 105 as to what program events correspond to a given control policy right. By extracting the conditions necessary for when a control policy right is appropriate (and should therefore be enforced) from the inline reference monitor code collecting the value of those conditions, and by grouping those conditions together in the knowledge base with the associated actions, it becomes much simpler to handle subtle mixings of program operations that should be controlled by the rights-management system 120.

For example, the flexibility provided by the APEX engine 115 enables exact specifications of the myriad ways that some applications can create new documents. Without complete knowledge of all these ways, it is impossible for a rights-management system 120 to enforce the automatic association of control policies with new documents. The flexibility also enables exact identification of the active document in applications that allow a user to open and manipulate multiple documents simultaneously. Applicants use such precise information to produce more informative user messages and audit log entries, and have those messages appear during program operations which provide a better context for the message. Furthermore, an accurate understanding of the state of an application and the logical lifetime of a document makes it straightforward to identify (and thus easily eliminate) repeated violations of the document's control policy by multiple executions of low-level program events.

Finally, by structuring of the APEX engine 115 as a distinct layer in a rights-aware application 100, one can greatly reduce the time and effort required when testing changes to the rights enforcement portion of the rights-aware application 100. Given a stable, well-defined interface between the APEX engine 115 and the inline reference monitors comprising the agent layer, one can build a simple tool for testing changes to the implementation of the APEX engine 115.

Figure 3:
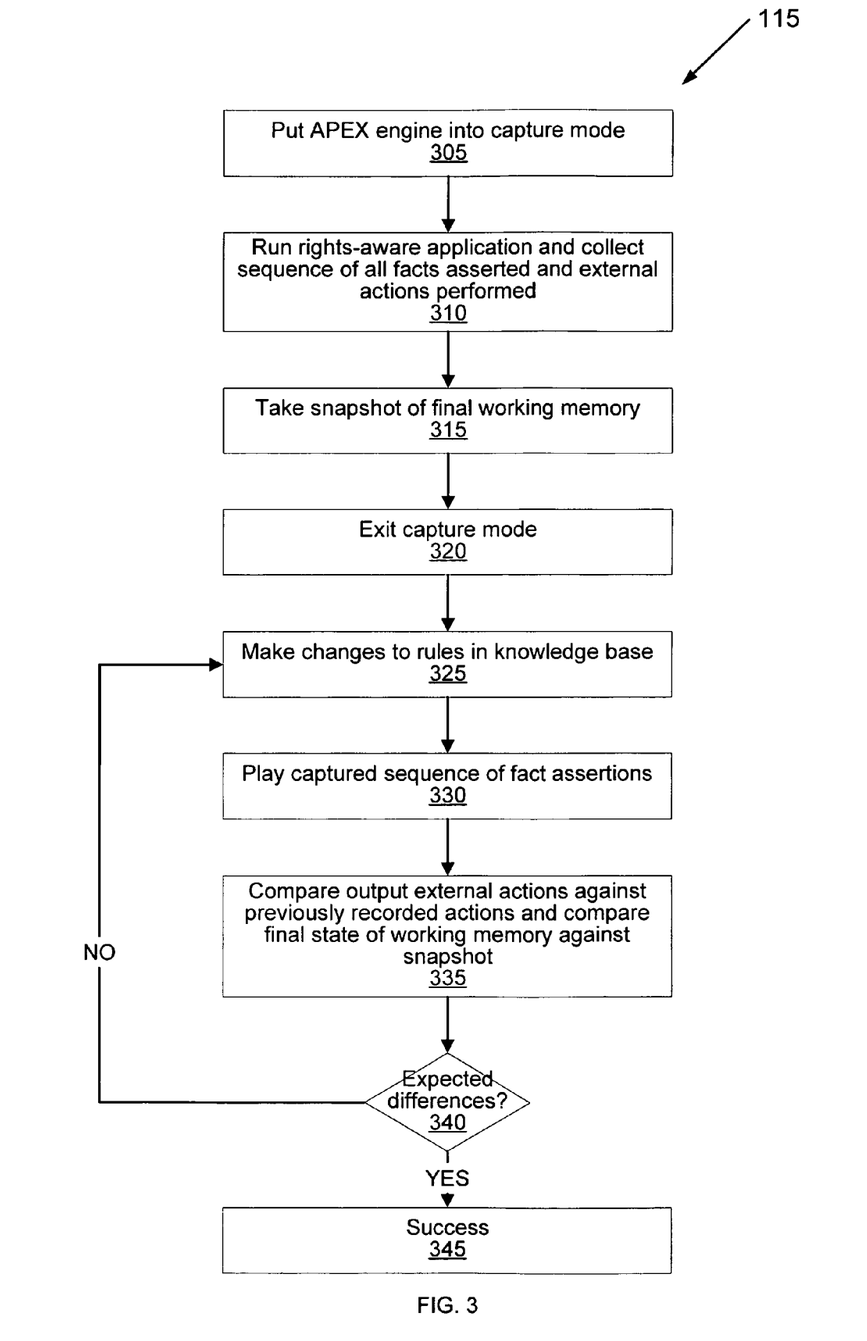
FIG. 3 is a flow diagram for testing the APEX engine of the rights-aware application of FIG. 1 in accordance with one embodiment of the present invention.

Referring to FIG. 3, the testing procedure involves putting the APEX engine 115 of FIG. 1 into capture mode at step 305. The rights-aware application 100 is then run and an input sequence (viz., facts asserted) and an output sequence (e.g., external actions performed or callouts to command objects) crossing the previously-mentioned well-defined interface are recorded at step 310. Additionally, fact modifications resulting from running the rights-aware application 100 are recorded by taking a final snapshot of the working memory 125 at step 315. With the input sequence and the output sequence recorded, the APEX engine 115 exits from capture mode at step 320.

Next, at step 325 some part of the implementation of the APEX engine 115 is changed, for example, a change to the knowledge base 130 to "fix" some known problem. This new implementation (or instance) of the APEX engine 115 is then fed at step 330 with the recorded input sequence (previously recorded at step 310). That is, at step 330, the recorded input sequence is "played back" to the new implementation of the APEX engine 115. At step 335, an output sequence from the new implementation of the APEX engine 115 is then recorded and compared to the previously recorded output sequence (previously recorded at step 315). Additionally, at step 315, the final state of the working memory 125 is compared to the snapshot of working memory 125 previously take at step 315.

Since the output sequence is the only way which the APEX engine 115 and ultimately the rights-management system 120 can affect the execution of the rights-aware application 100, one can immediately see if the enacted change fixed the outstanding problem. Similarly, one can immediate see if the enacted change "broke" something else, i.e., created another problem. If the differences between the previously recorded output sequence and the newly recorded output sequence are as expected at step 340 (i.e., the new implementation fixes the outstanding problem), then the new implementation is deemed to be successful at step 345.

If, however, the differences between the previously recorded output sequence and the newly recorded output sequence are not as expected at step 340 (i.e., the new implementation did not fix the outstanding problem or broke something), then the new implementation returns to step 325 for further testing. Steps 325 through 340 are subsequently repeated until the differences between the previously recorded output sequence and the newly recorded output sequence are as expected. Accordingly, being able to record and playback an input sequence and an output sequence, reduces both the time and effort required when testing changes to the rights enforcement portion of an application.

Additionally, given a comprehensive suite of previously recorded input and output sequences, one can also determine whether the change adversely affected any other operation of the rights-aware application, i.e., build regression suites for regression testing.

This approach has the potential to greatly reduce the time it takes to test changes to the APEX engine 115, because it allows the test engineers to eliminate the time delay between low-level program events. In other words, the testing tool can stream an input sequence to the APEX engine 115 potentially much faster than one is able to create that sequence of inputs by manipulating directly or through automating the user interface of the target application 105. As a result, testing changes to a rights-aware application 110 is not only faster with the present invention, but the testing tool does not have to be designed to deal with the idiosyncrasies of user interfaces on a myriad of target applications 115. Furthermore, the regression suites can easily run a library of recorded sequences across one or more applications and one or more versions of applications.

While this invention has been particularly shown and described with references to preferred embodiments thereof, it will be understood by those skilled in the art that various changes in form and details may be made therein without departing from the scope of the invention encompassed by the appended claims.

What is claimed is:

1. Computer apparatus for enforcing control policies of a rights-management system with respect to a target application, comprising:
   a computer having:
   a rules-based engine member for coupling between the rights-management system and one or more target applications, the rules-based engine member centralizing data security determinations for the target applications; and
   one or more agents coupled between the rules-based engine member and the target applications, the agents monitoring program operations of respective target applications as low-level program events in the respective target applications, and providing indications of respective monitored low-level program events to the rules-based engine member,
   wherein the rules-based engine member: i) in response to the indications provided by the agents, identifies specific patterns in sequences of low-level program events that signify actions by respective target applications and its users managed by the control policies of the rights-management system and updates states of respective target applications, wherein said identified specific patterns include specific patterns in sequences of low-level program events that signify a user's attempt to exercise a control policy right and ii) in response to requests of actions made by the agents, given the updated states of respective target applications, makes determinations to direct enforcement of the control policies through the agents; and
   wherein the rules-based engine member employs (i) a generic engine framework, (ii) a rules engine, (iii) a working memory storing assertions of the target applications as supplied by the agents, and (iv) a knowledge base holding sets of rules, and
   the sets of rules encode the control policies of the rights-management system as generic program events and application-level abstractions.

2. Computer apparatus as claimed in claim 1 wherein the rules-based engine member is structured as a distinct layer between the rights-management system and each target application.

3. Computer apparatus as claimed in claim 1 wherein the rules-based engine member (i) defines a logical lifetime of a document in terms of an application's use of the document in a manner which is independent of source code for the application being available (ii) tracks the logical lifetime of the document on a per application basis; and (iii) creates a document fact which lives as long as the application uses the document, the created document fact corresponding to the application's use of the document and serving as input to the rules-based engine.

4. A computer implemented method of enforcing control policies of a rights-management system with respect to a target application, comprising the steps of:
in a computer:
coupling a rules-based engine member between the rights-management system and one or more target applications, the rules-based engine member centralizing data security determinations for the target applications by: i) identifying specific patterns in sequences of low-level program events which signify actions by the respective target applications and its users managed by the control policies of the rights-management system and ii) updating states of respective target applications, wherein said identified specific patterns include specific patterns in sequences of low-level program events that signify a user's attempt to exercise a control policy right; and
monitoring program operations of respective target applications as low-level program events outside the rules-based engine member, the low-level program events being from the respective target application said monitoring resulting in respective indications of the low-level program events to the rules-based engine member, enabling the rules-based engine member to make determinations to direct enforcement of the control policies given the updated states of respective target applications
wherein the rules-based engine member employs (i) a generic engine framework, (ii) a rules engine, (iii) a working memory storing assertions of the target applications as supplied by the monitoring, and (iv) a knowledge base holding sets of rules, and
the sets of rules encode the control policies of the rights-management system as generic program events and application-level abstractions.

5. The computer implemented method of claim 4 wherein the monitoring includes:
(i) monitoring low-level program events of each target application, (ii) translating the monitored low-level program events into generic program events, and (iii) asserting the translated generic program events as facts to the rules-based engine; and
wherein the coupling includes:
producing judgments about the semantic significance of the sequence of low-level program events of each target application by evaluating the asserted facts against one or more rules, each rule encoding control polices of the rights-management system in a generic vocabulary; and
as a result of the producing, modifying behavior of each target application to conform to the control polices of the rights-management system.

6. The computer implemented method of claim 5 wherein the step of modifying includes any combination of: posting new facts or modifying existing facts which low-level enforcement code in each target application can then check, and executing code, coupled to the firing of a subsequent rule, which directly affects the state of each target application.

7. The computer implemented method of claim 5 wherein the step of monitoring further includes filtering the sequence of application events so that only significant events are asserted as facts to the rules-based engine.

8. The computer implemented method of claim 4 further comprising creating an application-specific instance of the rules-based engine based on existing instances of the rules-based engine.

9. The computer implemented method of claim 8 wherein the step of creating includes (i) identifying actual program operations relevant to enforce the control policies of the rights-management system, (ii) mapping the identified actual program operations to generic program events, (iii) grouping the mapped generic program events into one or more groupings, each grouping covering a set of possible control policy actions, (iv) identifying groupings of generic program events from existing applications which are identical to the grouped generic program events, (v) copying rules and fact definitions from the identified groupings of generic program events when identical groupings of generic program events are found in existing applications, (vi) creating new rules and new fact definitions for groupings of generic program events when identical groupings of generic program events are not found in existing applications.

10. The computer implemented method of claim 4 further comprising testing a first instance of the rules-based engine by (i) recording an input sequence of facts asserted to a second instance of the rules-based engine and recording an output sequence from the second instance of the rules-based engine, (ii) playing back the recorded input sequence of asserted facts to the first instance of the rules-based engine, (iii) comparing an output sequence from the first instance of the rules-based engine against the recorded output sequence from the second instance of the rules-based engine, and (iv) as a result of the comparing, determined whether the testing of the first instance of the rules-based engine is successful.

11. The computer implemented method of claim 10 wherein the output sequences from the first instance of the rules-based engine and the second instance of the rules-based engine are any combination of fact modifications and external actions.

12. The computer implemented method of claim 4 further comprising:
defining a logical lifetime of a document in terms of an application's use of the document, the defining being done in a manner which is independent of source code for the application being available;
tracking the logical lifetime of the document on a per application basis; and
as a result of the tracking, creating a document fact which lives as long as the application uses the document, the created document fact corresponds to the application's use of the document and serves as input to the rules-based engine.

13. The computer implemented method of claim 12 wherein the document fact stores judgments about the semantic significance of previously observed low-level program events on the document.

14. The computer implemented method of claim 4 further comprising:
tracking a series of low-level program events whose composition indicates a user's attempt to exercise a control policy right; and
auditing the user's attempt to exercise the control policy right.

15. The computer implemented method of claim 4 further comprising;

intercepting a user's attempt to exercise a control policy;

blocking the intercepted user's attempt to exercise the control policy right at a semantically appropriate level; and as a result of the blocking at the semantically appropriate level, suppressing duplicate audit messages resulting from the intercepted user's attempt from being generated.

16. Computer apparatus for enforcing control policies of a rights-management system with respect to a target application, comprising:

memory means storing facts relating to a program operation of the target application, the stored facts representing a state of the target application;

knowledge base means holding sets of rules to enforce control polices of the rights-management system with respect to the target application, wherein the sets of rules encode the control policies of the rights-management system as generic program events and application-level abstractions;

processor means operatively coupled to the memory means and the knowledge base means, and evaluating rules against the state of the target application represented by the stored facts resulting in directing enforcement of the control policies of the rights-management system given the facts relating to the program operation of the target application, the processor means evaluating rules by identifying specific patterns in sequences of low-level program events which signify actions by the target application and its users managed by the control policies of the rights-management system, wherein said identified specific patterns include specific patterns in sequences of low-level program events that signify a user's attempt to exercise a control policy right, the processor means employing a generic engine framework to translate the low-level program events into generic program events and use the resulting generic program events as facts about the state of the target application; and wherein the knowledge base means provides an efficient mechanism for adding, changing, and deleting the control policies of the rights-management system with respect to the target application, and wherein the processor means evaluating rules centralizes data security determinations for the target application.

17. Computer apparatus as claimed in claim 16 wherein the processor means evaluating rules against stored facts is a rules-based engine.

18. Computer apparatus as claimed in claim 17 wherein the rules-based engine is structured as a distinct layer between the rights-management system and the target application.

19. Computer apparatus as claimed in claim 16 wherein the memory means storing facts relating to the program operation of the target application stores facts in the vocabulary of the target application, the vocabulary of the target application being low-level application events and application level abstraction.

20. Computer apparatus as claimed in claim 16 wherein the memory means storing facts relating to the program operation of the target application is a flexible and expressive structure for specifying relatively small but important differences between common facts relating to the program operation of the target application.

21. Computer apparatus as claimed in claim 16 wherein the processor means evaluating is a flexible and expressive structure for considering relatively small but important differences between common facts relating to the program operation of the target application, the considered differences produces a minimal number of user messages and audit log entries which are semantically rich and accurately reflect the current target application and user activity.

22. A computer program product comprising a non-transitory computer memory medium including computer useable code for enforcing control policies of a rights-management system with respect to a target application, the computer program product including:

computer useable program code for coupling a rules-based engine member between a rights-management system and one or more target applications, the rules-based engine member centralizing data security determinations for the target applications by: i) identifying specific patterns in sequences of low-level program events which signify actions by respective target applications and its users managed by the control policies of the rights-management system, wherein said identified specific patterns include specific patterns in sequences of low-level program events that signify a user's attempt to exercise a control policy right and ii) updating states of respective target applications; and computer useable program code for monitoring programs operations of respective target applications as low-level program events outside the rules-based engine member, the low-level program events being from respective target applications, said monitoring resulting in respective indications of the low-level program events to the rules-based engine member, enabling the rules-based engine member to make determinations to direct enforcement of the control policies given the updated states of respective target applications;

wherein the rules-based engine member employs (i) a generic engine framework, (ii) a rules engine, (iii) a working memory storing assertions of the target applications as supplied by the monitoring, and (iv) a knowledge base holding sets of rules, and the sets of rules encode the control policies of the rights-management system as generic program events and application-level abstractions.

* * * * *